United States Patent
Garcia et al.

(10) Patent No.: US 10,239,712 B2
(45) Date of Patent: Mar. 26, 2019

(54) TERMINAL FOR TRANSFER OF DRY, FLOWABLE, GRANULAR MATERIALS

(71) Applicant: Robert Ober & Associates, LLC, San Antonio, TX (US)

(72) Inventors: Joseph Lloyd Garcia, San Antonio, TX (US); Robert Wayne Ober, San Antonio, TX (US)

(73) Assignee: Robert Ober & Associates, LLC, San Antonio, TX (US)

( * ) Notice: Subject to any disclaimer, the term of this patent is extended or adjusted under 35 U.S.C. 154(b) by 77 days.

(21) Appl. No.: 15/618,711

(22) Filed: Jun. 9, 2017

(65) Prior Publication Data

US 2018/0354732 A1  Dec. 13, 2018

(51) Int. Cl.
| | |
|---|---|
| *B65G 67/04* | (2006.01) |
| *G01G 19/02* | (2006.01) |
| *G01G 13/02* | (2006.01) |
| *B65G 67/60* | (2006.01) |

(52) U.S. Cl.
CPC .......... *B65G 67/04* (2013.01); *B65G 67/606* (2013.01); *G01G 13/022* (2013.01); *G01G 19/021* (2013.01); *B65G 2814/0314* (2013.01)

(58) Field of Classification Search
CPC .................. B65G 67/04; B65G 67/606; B65G 2814/0314; G01G 13/022; G01G 19/021
See application file for complete search history.

(56) References Cited

U.S. PATENT DOCUMENTS

| | | | | | |
|---|---|---|---|---|---|
| 2,946,626 | A | * | 7/1960 | Atkinson | B65G 53/28 406/109 |
| 3,235,104 | A | * | 2/1966 | Morawski | B65G 67/00 414/329 |
| 3,666,119 | A | * | 5/1972 | Parsons | B65D 90/623 340/617 |
| 3,964,620 | A | * | 6/1976 | Parsons | B65D 90/48 414/289 |
| 4,085,975 | A | * | 4/1978 | Bilkvist | B65G 53/28 406/109 |
| 4,264,243 | A | * | 4/1981 | Bentzen-Bilkvist | B65G 53/40 406/169 |
| 4,362,442 | A | * | 12/1982 | Bentzen-Bilkvist | B65G 53/28 406/109 |
| 4,609,309 | A | * | 9/1986 | Aralt | B65G 67/606 198/518 |
| 4,793,467 | A | * | 12/1988 | Johansson | B65G 33/20 198/518 |
| 6,050,767 | A | * | 4/2000 | Gay | B63B 35/28 414/139.8 |
| 6,609,543 | B2 | * | 8/2003 | Sridhar | B63B 35/44 141/104 |

(Continued)

*Primary Examiner* — Nicolas A Arnett
(74) *Attorney, Agent, or Firm* — Gunn, Lee & Cave, P.C.

(57) ABSTRACT

A transfer terminal is shown for off-loading dry, flowable, granular material from large transportation vehicles such as trucks or barges to smaller transport trucks. A pouch within a tank is provided for receiving the material, which material is distributed to storage silos. A single elevator is used to load the pouch and all storage silos. By aeration of the materials, a very low angle of repose is created for the material, which allows the material to flow at a very low angle, both to and from the various silos. Material being loaded into a transport truck flows through the pouch.

11 Claims, 10 Drawing Sheets

(56) References Cited

U.S. PATENT DOCUMENTS

| | | | | |
|---|---|---|---|---|
| 6,666,642 B2 * | 12/2003 | Fourcroy | ................ | B61C 15/10 |
| | | | | 414/339 |
| 6,745,701 B2 * | 6/2004 | Elder | ................... | B65D 90/623 |
| | | | | 105/247 |
| 7,278,811 B1 * | 10/2007 | Yielding | ................. | B63B 25/04 |
| | | | | 414/137.1 |
| 8,491,228 B2 * | 7/2013 | Snowdon | ............... | B01J 8/0025 |
| | | | | 406/14 |
| 9,776,813 B2 * | 10/2017 | McMahon | ........... | B65G 63/008 |
| 2003/0041771 A1 * | 3/2003 | Elder | ................... | B65D 90/623 |
| | | | | 105/247 |
| 2008/0226434 A1 * | 9/2008 | Smith | ................. | B65D 88/022 |
| | | | | 414/332 |
| 2011/0284027 A1 * | 11/2011 | Logan | ...................... | B08B 9/08 |
| | | | | 134/10 |

* cited by examiner

| LEGEND | |
|---|---|
| —— | GENERAL FLOW |
| ----- | FILL LINE |
| —— | VENT LINE |
| (IA) | INSTRUMENT AIR |
| (CB) | CENTRIFUGAL BLOWER AIR |
| (PD) | POSITIVE DISPLACEMENT AIR |
| (AA) | AERATION AIR |
| → | FLOW ARROW |
| ⌇ | OUTLINE |
| (M) | MOTOR |
| (LS) | LIMIT SWITCH |
| (P) | PRESSURE TRANSDUCER |
| (LA) | LEVEL ARM |
| ▷◁ | PLUG VALVE |
| \|✦\| | BUTTERFLY VALVE |
| ⧖ | ROTARY VALVE |
| ▷\| | CHECK VALVE |
| ▷◁ | PLUG VALVE |
| ⊢⊐ | SLIDE GATE |
| ⇌ | LOAD CELL |

Fig. 5C

| MOTOR LIST ||||||| 
|---|---|---|---|---|---|---|
| NO. | DESCRIPTION | QTY | RPM | HP | ΣHP | FLA |
| 1 | UNDERTRACK CENTRIFUGAL BLOWER | 1 | 3500 | 5 | 5 | 6 |
| 2 | 250 TPH BUCKET ELEVATOR | 1 | 1750 | 40 | 40 | 48 |
| 3 | DCL CMF660 DUST COLLECTOR | 1 | 1800 | 15 | 15 | 21 |
| 4 | SILOTOP CENTRIFUGAL BLOWER | 1 | 3600 | 5 | 5 | 6 |
| 5 | LOADOUT/SILO AREATION PD BLOWER | 1 | 1800 | 10 | 10 | 14.1 |
| 6 | DUAL AXIS SPOUT POSITIONER | 2 | 1800 | 1 | 2 | 4.2 |
| 7 | DCL CMF330 DUST COLLECTOR | 1 | 3600 | 7.5 | 7.5 | 9 |
| 8 | UN800 RETRACTEABLE LOADING SPOUT | 1 | 1800 | 1 | 1 | 2.1 |
| 9 | RECLAIM CENTRIFUGAL BLOWER | 1 | 3600 | 5 | 5 | 6 |
| 10 | CONTROL AIR COMPRESSOR | 1 | 1800 | 50 | 50 | 68 |
| 11 | COMPRESSOR COOLING FAN | 1 | 1800 | 1.5 | 1.5 | 2.2 |
| 12 | PIT SUMP PUMP | 1 | 1800 | 1 | 1 | 9.1 |
|  |  |  |  | TOTALS | 143 | 200* |

*FULL LOAD AMPS AE ESTIMATED

Fig. 5D

TERMINAL FOR TRANSFER OF DRY, FLOWABLE, GRANULAR MATERIALS

BACKGROUND OF THE INVENTION

1. Field of the Invention

The present invention relates to a transfer terminal and, more particularly, to a transfer terminal for dry, flowable, granular materials.

2. Description of the Prior Art

With the production of hydrocarbons using fracing techniques, the need has developed for a terminal that can transfer dry, flowable, granular material such as sand from a rail car or barge to transport trucks (also called bulker truck) that can travel down a highway. A problem has developed because trains or barges would deliver a large amount of material at one time to a terminal, but transport trucks can only carry out so much material over time. Therefore, some type of temporary storage is necessary for the dry, flowable, granular material. Likewise, bulk powder manufacturers require rapidly deployed terminals in new markets and outlying areas In the past, the typical method of unloading the train or barge was to have a pit in which the dry, flowable, granular material is dumped with elevators moving the dry, flowable, granular materials into silos that extend a considerable distance up into the air. Below the silos would be a loading chute where the dry, flowable, granular materials would normally flow by gravity into a transport truck. Problems exist with this typical arrangement where a collection of silos are side-by-side. First, the group of silos need an elevator to lift the dry, flowable, granular material from the pit into the silo. Second, the angle for the flow of a dry, flowable, granular material would have to be greater than the angle of repose for the material being loaded. Third, it is very expensive to have silos extending a considerable distance up in the air so that a transport truck can drive underneath or beside the silos for loading. Fourth, the off-loading into the transfer terminal is normally much faster than the removal of the dry, flowable, granular material from the transfer terminal by transport trucks.

Inexpensive, rapidly deployed transfer terminals are necessary to keep a dry, flowable, granular material such as sand available for hydraulic fracing or construction. A need exists for a smaller, less expensive transfer terminal that can still keep up with the demand at the transfer site. The smaller, less expensive transfer terminal can be installed at locations to allow emerging market demands to be met.

In addition to keeping up with the transfer demands for the transfer terminal, the transfer terminal must be environmentally friendly, which means any dust caused by the transfer must be collected and not discharged to atmosphere.

Lastly, to the extent possible, a transfer terminal should be movable from one location to another. For example, as the drilling in one oil field is completed, the transfer terminal will have to be moved to another oil field where fracing is required. In construction, as demands decrease in one area and expand in another, the transfer terminal can be moved.

While the background of the invention is described in connection with fracing of an oil field, or as required in construction markets, any dry, flowable, granular material that must be transferred from carriers such as trains or barges to transport trucks, the transfer terminal could be used for any type of facility where there are surges of dry, flowable, granular material being delivered to the transfer terminal, but the removal of the dry, flowable, granular materials is much slower, the transfer terminal can be used.

SUMMARY OF THE INVENTION

It is an object of the present invention to provide a terminal for transfer of dry, flowable, granular materials.

It is another object of the present invention to provide a terminal for dry, flowable, granular materials where the volume of material flowing into the terminal fluctuates and the volume of material flowing out of the terminal fluctuates.

It is another object of the present invention to provide a transfer terminal with multiple storage silos, but only one internally fixed elevator is used to fill the multiple silos. No external elevator is needed.

It is yet another object of the present invention to provide a low angle of repose for the dry, flowable, granular material by flowing high volume, low pressure air there through.

It is still another object of the present invention to provide a Kangaroo* tank (tank within a tank) with material flowing out of the transfer terminal coming from a pouch tank, i.e., the tank within a tank, which Kangaroo tank is equipped with an internal bucket elevator.

*Kangaroo is a trademark of the Assignee of the present patent application.

It is still another object of the present invention to provide dust collectors at every place air is discharged to the atmosphere from the transfer terminal.

It is another object of the present invention to have multiple silos storing dry, flowable, granular material, but only one of the multiple silos having an internal pouch through which all of the dry, flowable material flows prior to being discharged into a transport truck. High volume, low pressure air flows through each transfer line so that the angle of repose of the dry, flowable, granular material is greatly reduced. Each of the silos has a fill slide at the top and a discharge slide at the bottom. The elevator to raise the dry, flowable, granular material to the top of the silos is located internally within the same silo containing the pouch, i.e., the Kangaroo tank.

In the present invention, a dry, flowable, granular material such as sand or cement will be received from either a train or off-loaded from a barge into an input hopper. From the input hopper, the sand or cement will flow therefrom through a loading air slide to a pit for an elevator that lifts the sand to the top of a Kangaroo tank that has a pouch on the inside thereof. The sand will be dumped into the pouch. After the pouch is full, the sand will overflow and fill the outside tank within the Kangaroo tank. Once fill sensors are reached, valves at the top of the Kangaroo tank are switched to allow the filling of adjacent silos. At the top of the elevator, charging air slides allow the sand or cement to flow at a low angle of repose to the top of the silo selected. The appropriate valve for the selected silo will open and allow that silo to be filled.

The sand or cement is off-loaded from the transfer terminal through the pouch and a discharging slide to an offset discharge spout for emptying into a transport truck. The pouch is continually replenished by sand received from either (a) the outside tank of the Kangaroo tank or (b) the adjacent silos by a transfer air slide located there below. The transfer air slides move the sand to the bottom of the elevator within the Kangaroo tank where the sand is then lifted and discharged into the pouch. While the loading air slides are continually filling the Kangaroo tank or the silos, the transfer air slides are continually drawing from the bottom thereof and recharging the pouch. From the pouch, sand or cement is periodically flowing through a loading air slide and discharge spout into transfer trucks.

DESCRIPTION OF THE PREFERRED EMBODIMENT

Figure 1A:
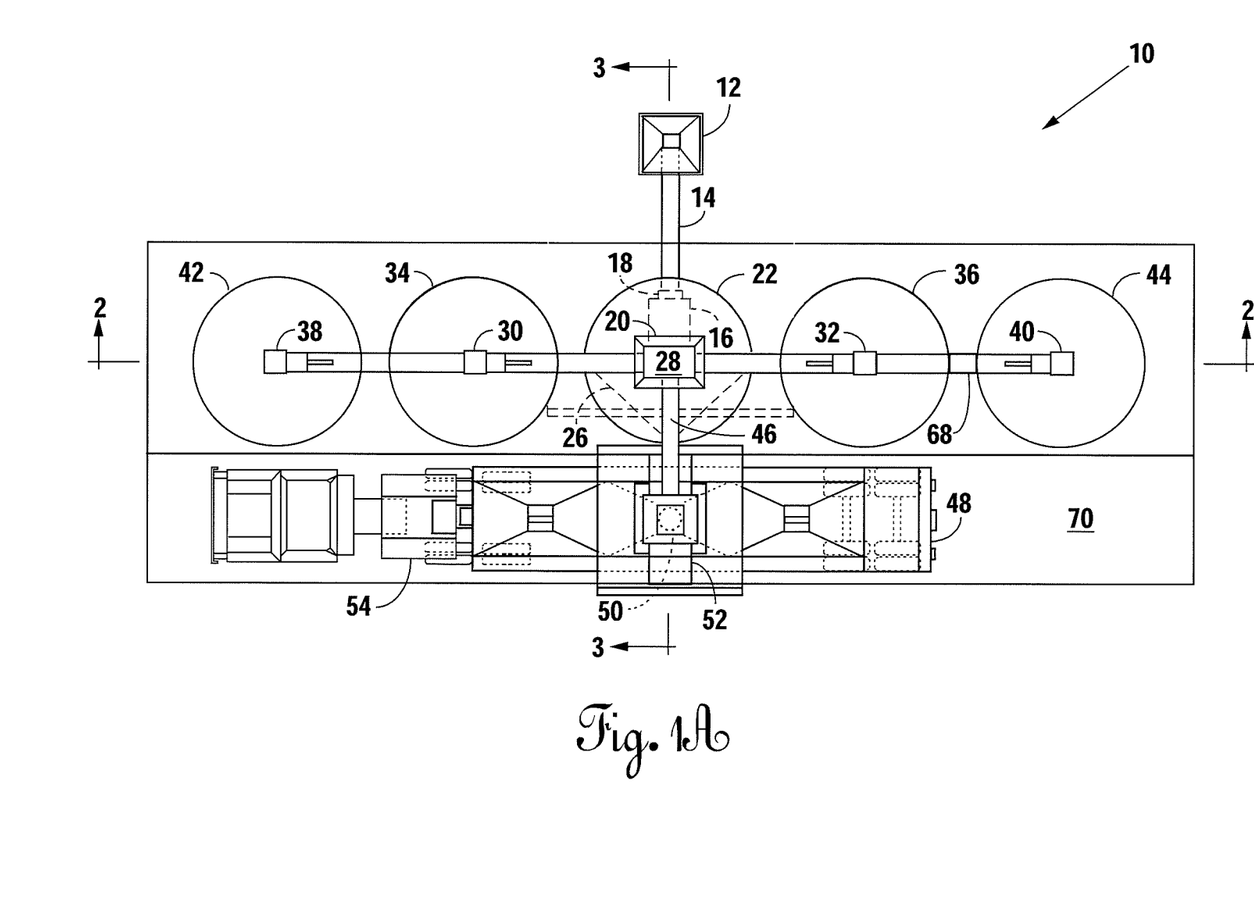
FIG. 1A is a simplified top view of the present invention.
Figure 1B:
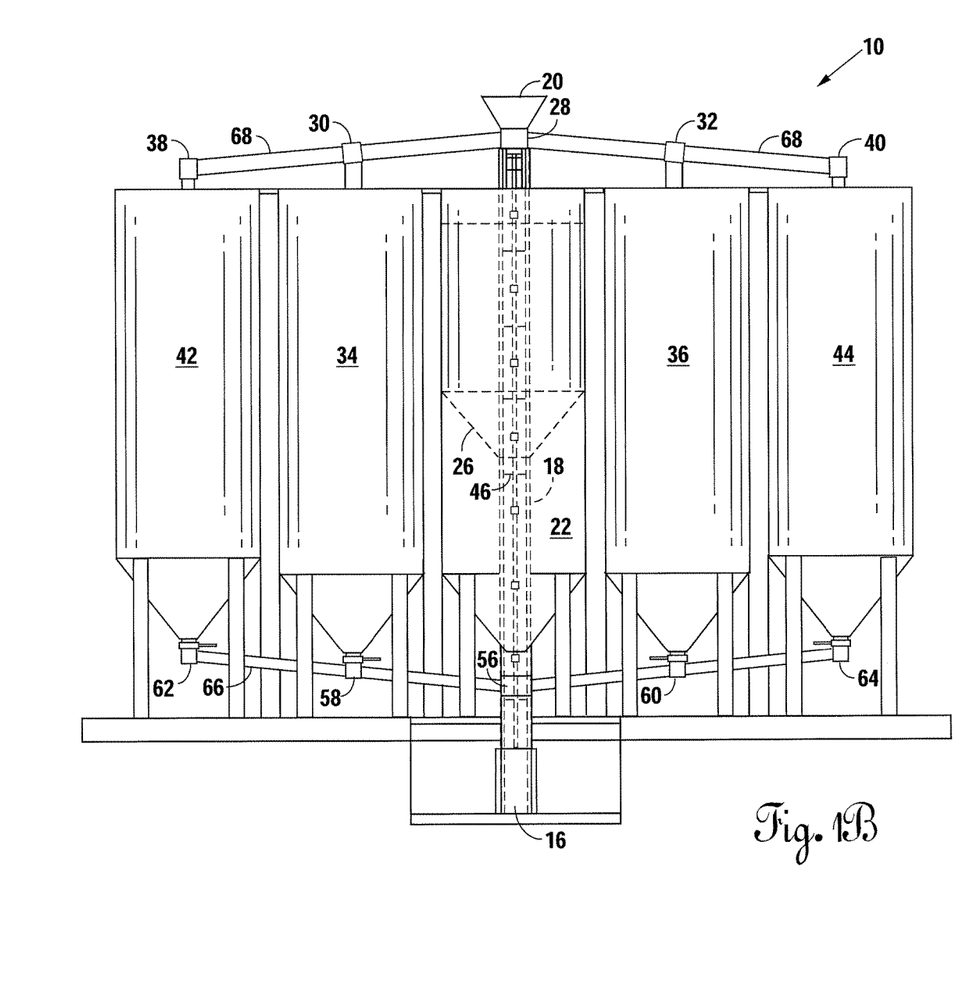
FIG. 1B is a simplified front view of the present invention without the transport truck area.
Figure 1C:
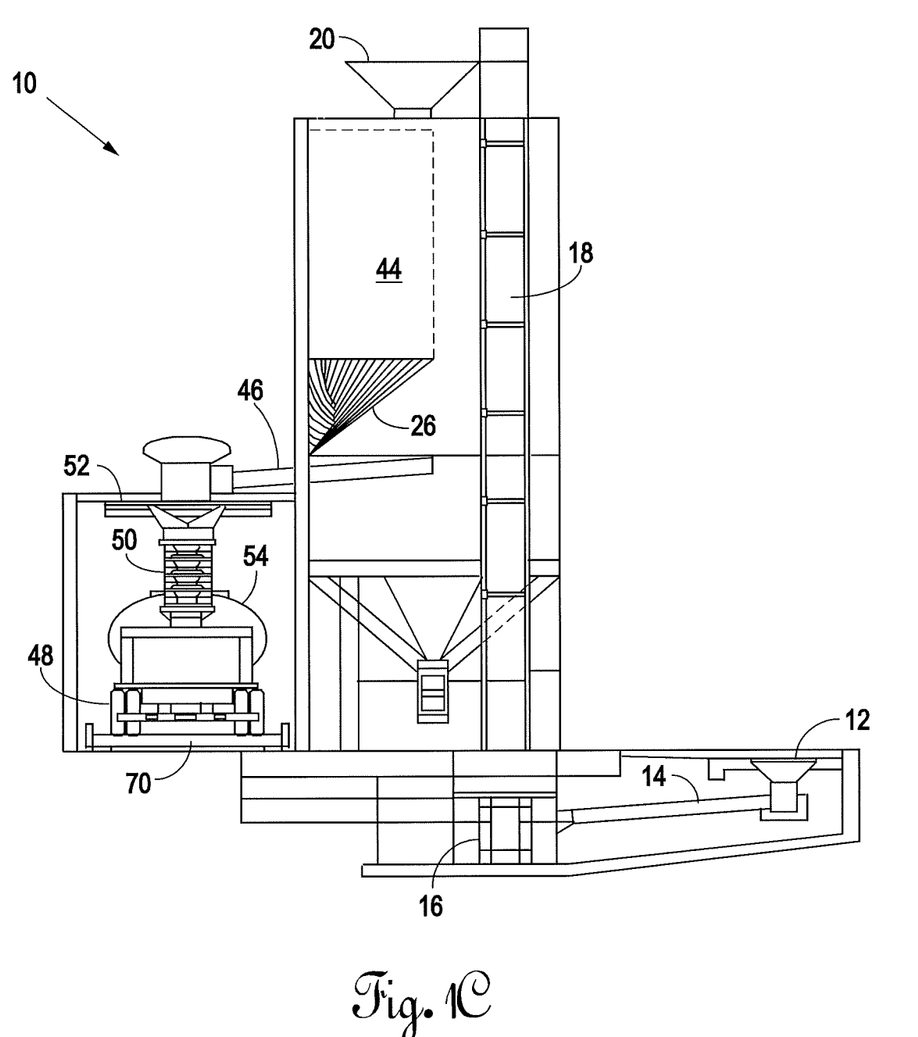
FIG. 1C is a simplified side view of the present invention.

Referring to FIGS. 1A, 1B and 1C, a top, front and side view of the present invention is shown in a simplified form. A transfer terminal is represented generally by reference numeral 10, which transfer terminal receives a dry, flowable, granular material at an input hopper 12. A typical dry, flowable material is sand of the type used in fracing in the petroleum industry, or cement as used in the construction industry. For the purposes of this invention, Applicant will simply refer to sand, but any dry, flowable, granular material may be transferred using the transfer terminal 10.

While the input hopper 12 is designed to receive sand from railroad cars, the input hopper 12 could receive sand from barges with an appropriate unloading mechanism from the barge (not shown).

Figure 2:
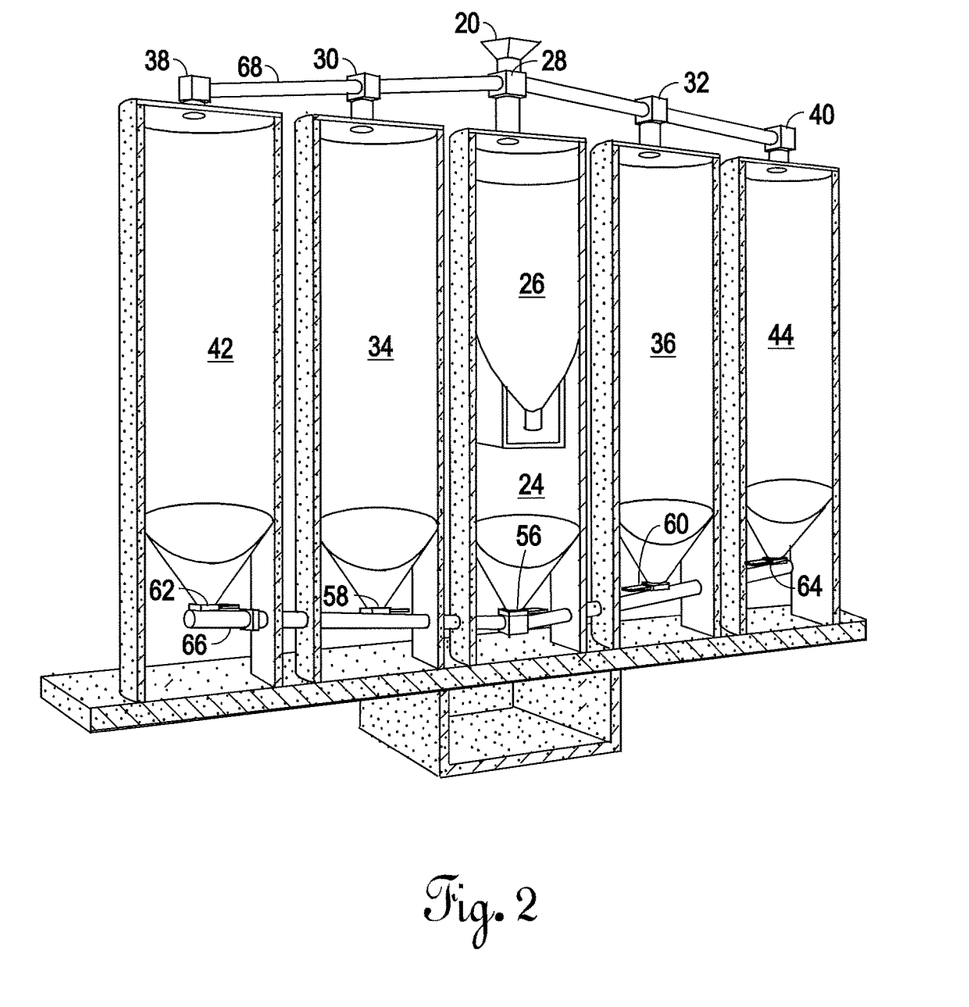
FIG. 2 is a cross-sectional view of FIG. 1A along section lines 2-2.
Figure 3:
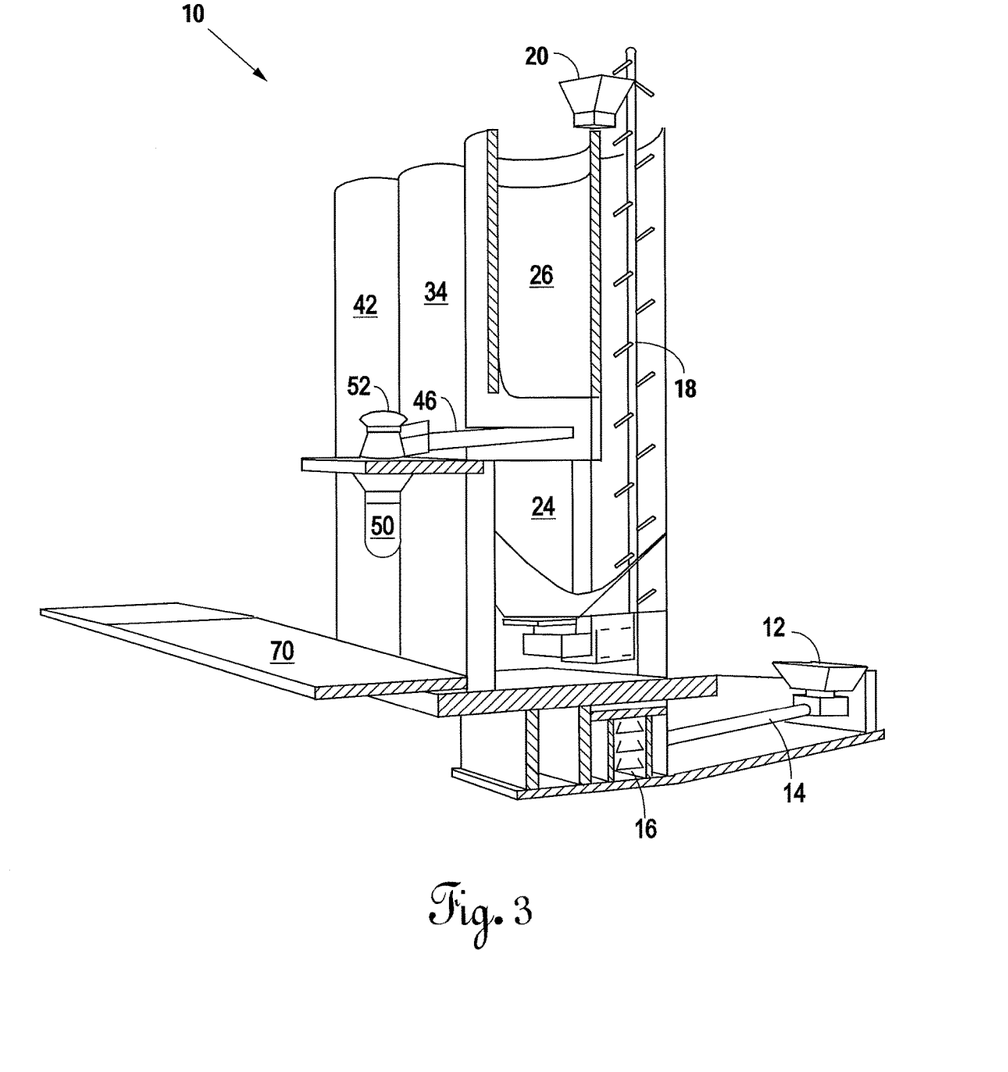
FIG. 3 is a cross-sectional view of FIG. 1A along section lines 3-3.

From the input hopper 12, sand will flow via a loading air slide 14 (as will be described in more detail subsequently) to an elevator pit 16. From the elevator pit 16, a bucket elevator 18 (or any other suitable elevator) lifts the sand from the elevator pit 16 to a receiving hopper 20 at the top of the Kangaroo tank 22. The Kangaroo tank 22 has an external tank 24 and a pouch 26 inside of the external tank 24. The construction of the Kangaroo tank 22 with the external tank 24 and pouch 26 is better shown in the partial, cross-sectional views of FIGS. 2 and 3.

Sand being raised by the bucket elevator 18 to the receiving hopper 20 will flow into the pouch 26 until the pouch 26 is over-flowing. Thereafter, the sand over-flowing pouch 26 will fill the external tank 24. Once the external tank 24 is filled as determined by limit switches (which will be described subsequently in conjunction with FIGS. 5A and 5B), Kangaroo valve 28 will close and one of the silo fill valves 30 or 32 will open for inboard silos 34 or 36, respectively. After inboard silos 34 and 36 are filled as determined by level switches therein, outboard silo fill valves 38 or 40 may open for outboard silos 42 or 44, respectively, to fill.

Sand from the transfer terminal 10 flows out through pouch 26 and discharging air slide 46. From the discharging air slide 46, the sand may be dumped into a waiting transport truck 48 through loading down spout 50. As transport truck 48 is filled, loading through the loading down spout 50 may be temporarily stopped by closing slide gate 52. After the slide gate 52 is closed, the loading down spout 50 may be repositioned to other inlets (not shown) of the transport truck 48 or a different transport truck 54.

As the sand in the pouch 26 flows through the discharge in air slide 46 and loading down spout 50 into transport truck 48, the pouch 26 will become deplenished. Typically, there is enough sand in pouch 26 to load three transport trucks 48. Pouch 26 is replenished by sand lifted by bucket elevator 18 through receiving hopper 20 and Kangaroo valve 28. Assuming there is currently no train or barge being unloaded through the input hopper 12 to fill the elevator pit 16, then the elevator pit 16 will be filled with sand from either external tank 24, inboard silos 34 and 36 or outboard silos 42 and 44. While a computer program will select the particular storage vessel 28, 34, 36, 42 or 44 from which to draw sand, slide valves 56, 58, 60, 62 and 64 controls the flow of sand there from. Only one of the slide valves 56, 58, 60, 62 and 64 will be opened at a time. The opening of slide valve 56 draws sand from external tank 24. Opening of slide valve 58 draws sand from inboard silo 34. Opening of slide valve 60 draws sand from inboard silo 36. Opening of slide valve 62 draws sand from outboard silo 42. Opening of slide valve 64 draws sand from outboard silo 44. From the respective slide valves 56, 58, 60, 62 or 64, a loading air slide 66 will move the sand to the elevator pit 16.

As an example, sand can be drawn from the outboard silo 42 through slide valve 62 and loading air slide 66 to the elevator pit 16 where the elevator bucket 18 raises the sand and dumps it in receiving hopper 20. From the receiving hopper 20, the sand will flow into the pouch 26. Once outboard silo 42 is emptied, the slide valve 62 may be closed and slide valve 64 opened to now draw sand from outboard silo 44. Again, sand would flow through the loading air slide 66 to the elevator pit 16 (see FIG. 1B) where the sand is lifted by the bucket elevator 18 to the receiving hopper 20 before flowing into the pouch 26.

Figure 4:
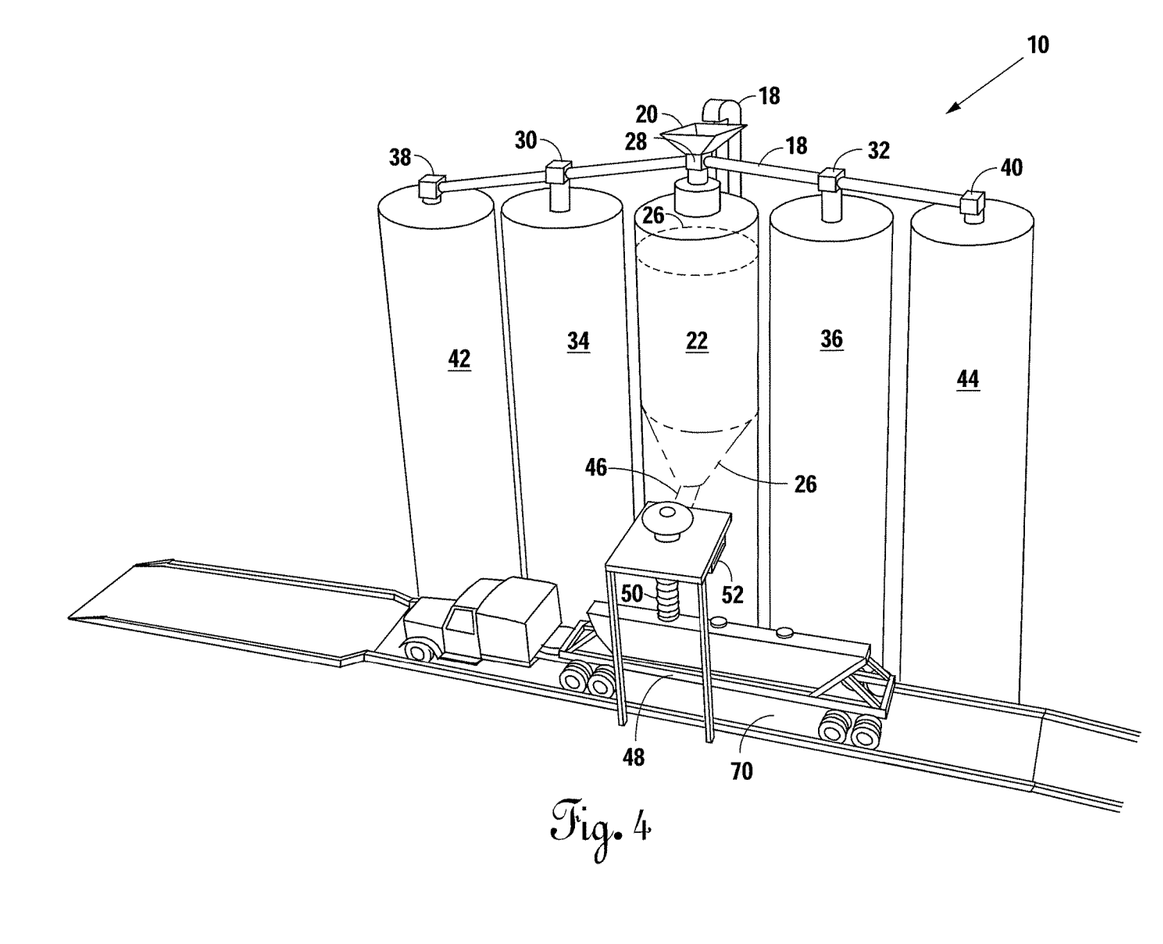
FIG. 4 is a more detailed perspective view of the present invention.

The transfer terminal 10, as previously explained in conjunction with FIGS. 1A, 1B, and 1C, FIG. 2 and FIG. 3 is shown in an external perspective view in FIG. 4. While FIG. 4 shows externally the Kangaroo tank 22, inboard silo 34, inboard silo 36, outboard 42 and outboard silo 44, it does not show the internal operation. At the top of the Kangaroo tank 22, inboard silo 34 or 36 or outboard silos 42 or 44, are the respective fill valves 28, 30, 32, 38 or 40 located along the fill air slide 68. By selection of Kangaroo fill valve 28, silo fill valve 30, silo fill valve 32, outboard silo fill valve 38 or outboard silo fill valve 40, respectively, Kangaroo tank 22, inboard silo 34, inboard silo 36, outboard silo 42, or outboard silo 44 may be filled. Also in FIG. 4, discharging air slide 46 can be seen through which sand flows to loading down pout 50 to fill the transport truck 48. Simultaneously, a scale 70 will weigh the transport truck 48 before, during and after filling to make sure the load does not exceed maximum weight permitted. Scale 70 may be moveable to a different location.

Figure 5A:
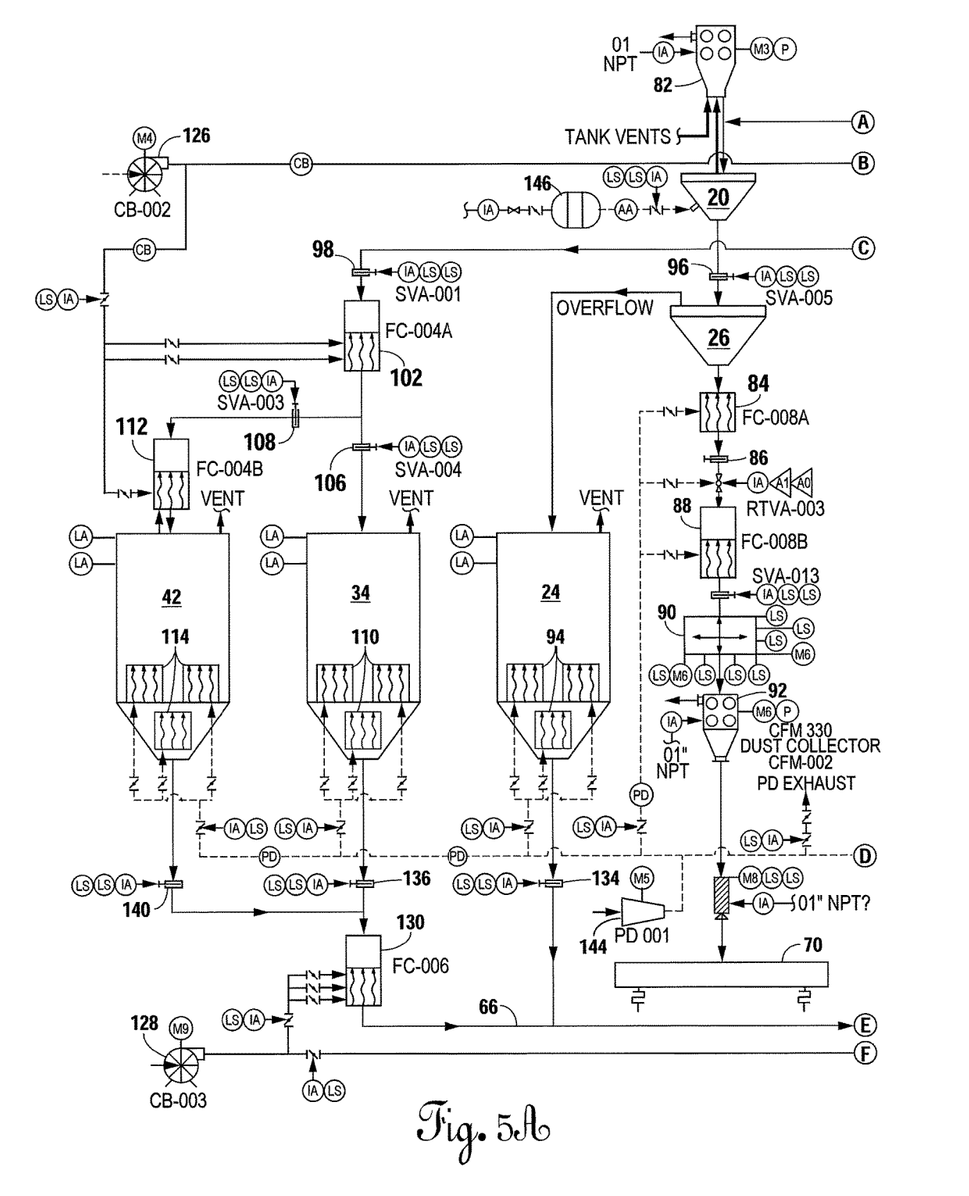
FIGS. 5A and 5B are schematic flow diagrams for the transfer terminal shown in FIGS. 1-4.
Figure 5B:
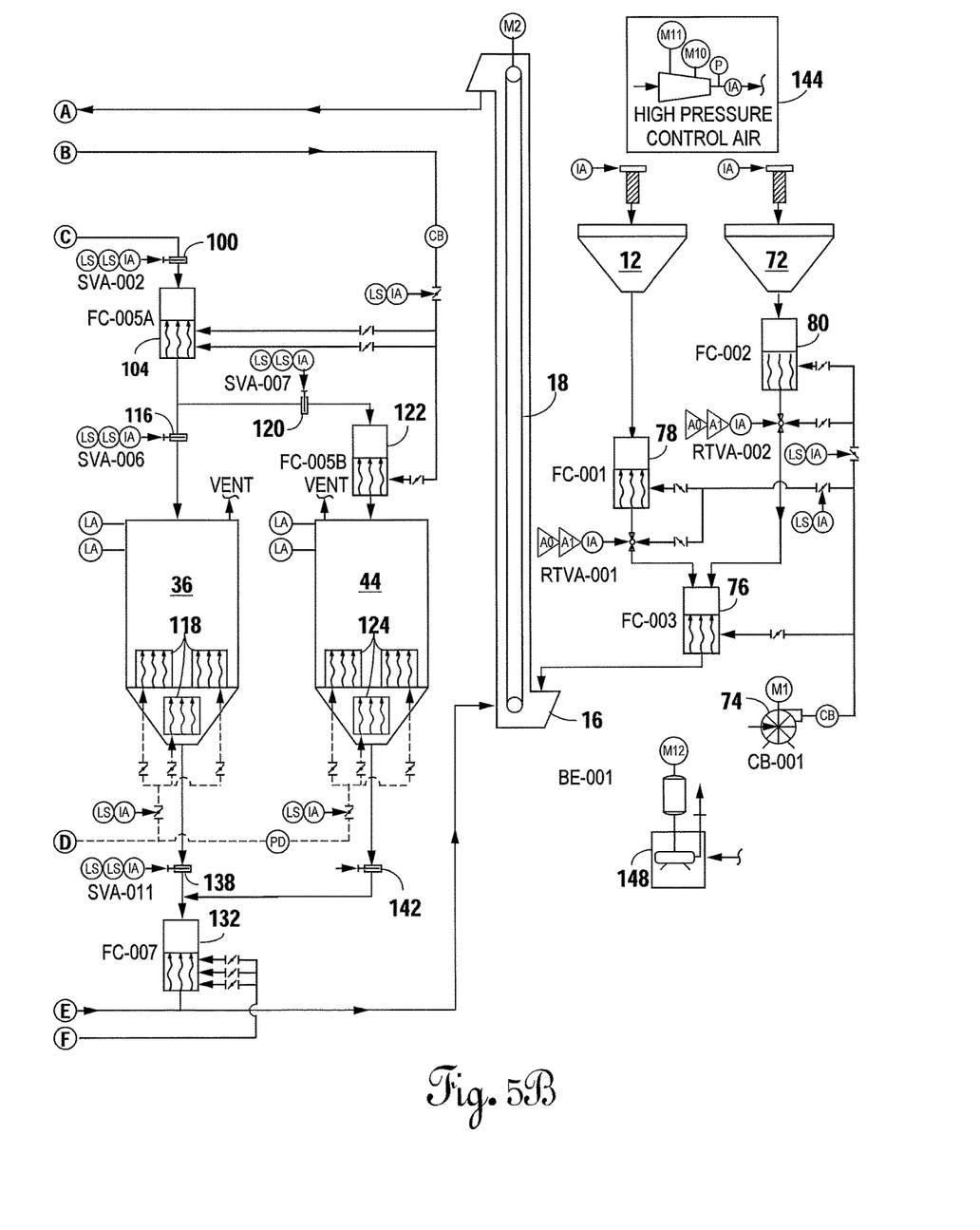
Figure 5C:
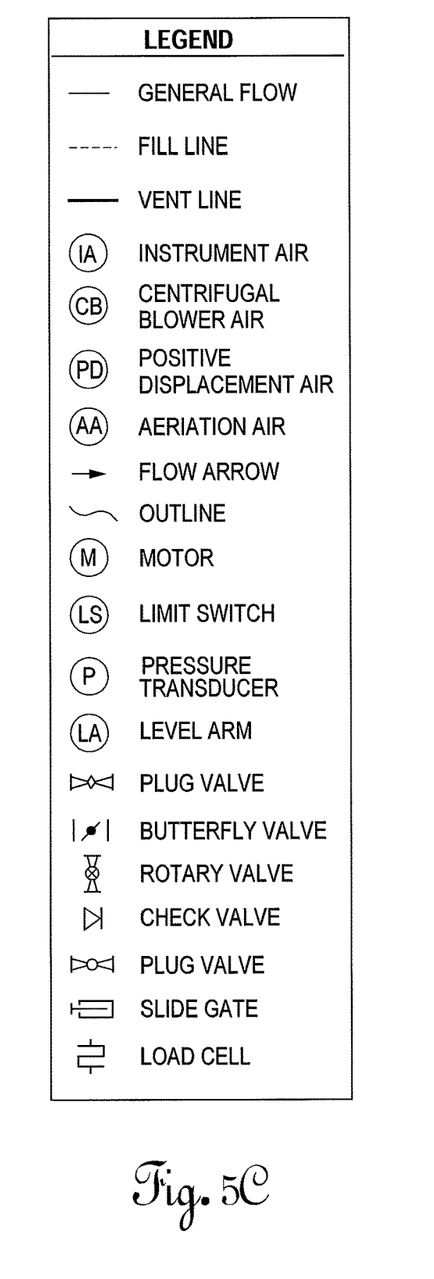
FIG. 5C is the legend for FIGS. 5A and 5B.

FIGS. 5A and 5B are simplified schematic flow diagrams illustrating the flow of sand and air in the transfer terminal 10. Where applicable, the same numbers as previously used in FIGS. 1-4 will also be used in FIGS. 5A and 5B. In addition to the schematic flow diagram as shown in FIGS. 5A and 5B, legends for FIGS. 5A and 5B are illustrated in FIG. 5C and a motor list is given in FIG. 5D. The legends and motors as listed in FIGS. 5C and 5D, respectively, are used in FIGS. 5A and 5B.

As previously described, sand may flow in at a rail terminal through input hopper 12. To give additional capacity to avoid waiting for sand, an auxiliary input hopper 72 is also provided. A blower 74 forces a high volume, low pressure air through aerators 76, 78 and 80. The aerators 76, 78 and 80 keep the sand free and flowing from either input hopper 12 or auxiliary input hopper 72. From the aerator 76, the sand flows into the elevator pit 16 to the bucket elevator 18. The bucket elevator 18 picks up the sand and discharges the sand into the receiving hopper 20. Dust collector 82 prevents any dust from discharge of the sand into the receiving hopper 20 from reaching the atmosphere. From the receiving hopper 20, the sand flows into receiving pouch 26 which is located inside of the Kangaroo tank 22 (see FIGS. 2 and 3). An aerator 84 keeps the sand inside the pouch 26 free flowing. When slide gate 86 is opened, aerator 88 keeps the sand free flowing through the load out device 90. The load out device 90 includes as subparts thereof the discharge air slide 46, loading down spout 50 and slide gate 52 shown in FIG. 3. High volume, low pressure air flowing through the discharge air slide 46 lowers the angle of repose of sand to less than 10 degrees. Again a dust collector 92 ensures dust has not escaped to atmosphere when loading the sand into a transport truck 48, which transport truck 48 will be sitting on the truck scale 70.

Sand continues to flow into pouch 26 until pouch 26 is full. Thereafter, overflow sand from pouch 26 will simply flow into the external tank 24. Aerators 94 will keep the sand loose inside of external tank 24.

By operation of the fill slide valves 96, 98 or 100, the sand flows into either pouch 26, inboard silo 34 or inboard silo 36, respectively. Aerator 102 will keep the sand flowing into inboard silo 34 and aerator 104 will keep the sand flowing into inboard silo 36. When inboard silo 34 is being filled, slide valve 106 is open and outboard slide valve 108 is closed. Inside of inboard silo 34 are located aerators 110 to keep the sand free flowing.

To fill the outboard silo 42, slide valve 106 is closed and outboard slide valve 108 is opened. Aerator 112 will keep the sand free flowing through fill air slide 68 (see FIG. 4) into outboard silo 42. Inside of outboard silo 42 are aerators 114 which keeps the sand free flowing.

To fill inboard silo 36, slide valve 116 must be opened. Aerators 118 keep the sand loose inside of inboard silo 36. To fill outboard silo 44, slide valve 116 must be closed and outboard slide valve 120 open. Aerator 122 keeps the sand free flowing into outboard silo 44. Aerators 124 keeps the sand loose inside of outboard silo 44. Aerators 104, 122, 102 and 112 receive their high volume, low pressure air from blower 126. If sand is to flow from either external tank 24, inboard silos 34 or 36 or outboard silos 42 or 44, it must flow through loading air slide 66 to the elevator pit 16 and bucket elevator 18. To allow the sand to flow at a very low angle of repose, i.e., less than 10 degrees, a blower 128 provides high volume, low pressure air to loading air slide 66 through aerators 130 and 132. Opening of slide gate 134 allows sand to be drawn from external tank 24. Opening of slide gate 136 allows sand to be drawn from inboard silo 34. Opening of slide gate 138 allows sand to be drawn from inboard silo 36.

Opening of slide gate 140 allows sand to be drawn from outboard silo 42. Opening of slide gate 142 allows sand to be drawn from outboard silo 44. Only one the slide gates 134, 136, 138, 140 or 142 is open at a time.

A source of high pressure control air 144 is provided to operate valves in the transfer terminal 10. The high pressure control air 10 may have a pressure tank 146 to give a reserve of high pressure air.

In case the elevator pit 16 starts accumulating fluids, a pit sump pump 148 will remove any fluids from the elevator pit 16.

In the transfer terminal just described in conjunction with FIGS. 5A, 5B, 5C and 5D, the input hopper 12 or auxiliary input hopper 72 may be filled from either a train or barge. The sand will be lifted by the bucket elevator 18 (or any other suitable elevator) into a receiving hopper 20. From the receiving hopper 20 the sand may flow either to the pouch 26 with overflow being received in external tank 24 of the Kangaroo tank 22 or into inboard silos 34 or 36. By appropriate switching of slide gates 106 and 108, outboard silo 42 can be filled. By appropriate switching of slide gates 116 and 120, outboard silo 44 can be filled. Optimally, any of the inboard silos 34 or 36 or outboard silos 42 or 44 can be filled in any order. Level arms (LA) will determine when the external tank 24, inboard silos 34 and 36, and outboard silos 42 and 44 are full. The only requirement is to try to keep the pouch 26 filled with sand. Sand contained in the pouch 26 is what will be used to fill transport trucks 48. The pouch 26 should hold enough sand to fill a total of three transport trucks 48.

Sand being removed from either the external tank 24, inboard silo 34 or 36 or outboard silos 42 or 44 must flow through the loading air slide 66 to the elevator pit 16, the bucket elevator 18 into the receiving hopper 20. From the receiving hopper 20, the sand optionally may flow to the pouch 26, inboard silo 34, inboard silo 36, outboard silo 42 or outboard silo 44.

Any sand being elevated by the transfer terminal 10 must be elevated by the bucket elevator 18. The bucket elevator 18 is contained inside of the Kangaroo tank 22. The Kangaroo tank 22 contains therein the pouch 26, the elevator 18 and the external tank 24. To keep the sand loose, the transfer terminal 10 can be programmed to periodically open different valves to move the sand within the transfer terminal 10 to keep it from clogging any part of the system. The bucket elevator 18 will continue to operate unless transfer terminal 10 is being shut down for a period of time.

The filling of the various silos or tanks can occur in any selected order as long as the pouch 26 is filled first. Sand from inboard silos 34 and 36, outboard silos 42 or 44 or external tank 24 can be removed in any order desired through the loading air slide 26 via the bucket elevator 18.

Figure 5D:
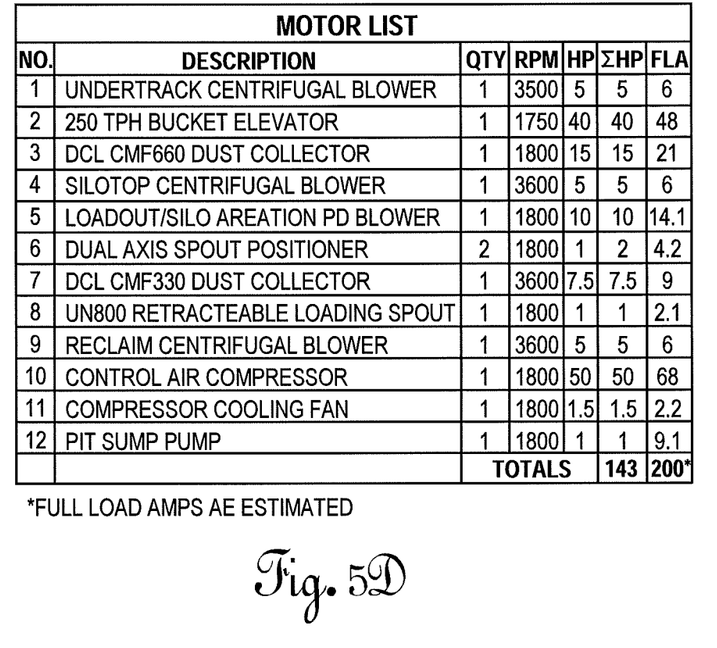
FIG. 5D is the motor list for the motors shown in FIGS. 5A and 5B.

FIG. 5C is a legend table for FIGS. 5A and 5B. By use of the legend table, items are shown, but may not be individually discussed. FIG. 5D is a listing of the motors used in FIGS. 5A and 5B, but will not be discussed individually.

We claim:

1. A terminal for transferring dry, flowable, granular material from a train or barge to a transport truck, said terminal comprising:
    an input hopper for receiving said dry, flowable, granular material from said train or barge;
    a loading air slide for moving sideways said dry, flowable, granular material to an elevator pit;
    a loading tank over said elevator pit;
    an elevator lifting said dry, flowable, granular material to a top of said loading tank;
    a pouch inside said loading tank for receiving said dry, flowable, granular material from said elevator, said loading tank enclosing said pouch and said elevator so that when said pouch overflows with the dry, flowable, granular material the overflow fills said loading tank;
    a discharging air slide connecting sideways from a bottom of said pouch to a loading downspout located above said transport truck;
    a scale for receiving said transport truck thereon and weighing said transport truck and contents thereof;

a loading slide gate in said loading downspout to periodically interrupt flow of said dry, flowable, granular material there through;

inboard silos located adjacent to said loading tank;

a fill air slide being above said loading tank and said inboard silos;

an empty air slide being located from below said inboard silos to said elevator pit;

valves above and below said loading tank and said inboard silos causing said dry, flowable, granular material to always fill said pouch in a preselected order from said loading tank or said inbound silos via said elevator.

2. The terminal for transferring dry, flowable, granular material as recited in claim 1 includes a source of high volume low pressure air is being supplied to (a) said loading air slide, (b) said discharging air slide, (c) said fill air slide and (d) said empty air slide so that the angle of repose of said dry, flowable, granular material therein is less than 10 degrees.

3. The terminal for transferring dry, flowable, granular material as recited in claim 2 further comprises outboard silos connected to said loading tank and said inboard silos via (a) said discharging air slide and (b) said fill air slide, said outboard silos being included in said preselected order.

4. The terminal for transferring dry, flowable, granular material as recited in claim 3 wherein said high volume low pressure air aerates said loading tank, said inboard silos and said external silos.

5. The terminal for transferring dry, flowable, granular material as recited in claim 4 wherein said elevator continues to run and move said dry, flowable, granular material through said loading tank, said inboard silos and said outboard silos.

6. A method of transferring dry, flowable, granular material from trains or barges to transport trucks, said method including the following steps:

flowing of said dry, flowable, granular material from said train or barge into an input hopper;

moving said dry, flowable, granular material generally sideways with a loading air slide from said input hopper to an elevator pit;

lifting said dry, flowable, granular material by an elevator from said elevator pit to a top of a loading tank located over said elevator pit;

dumping said dry, flowable, granular material from said elevator into a pouch within said loading tank;

discharging said dry, flowable, granular material generally sideways through a discharging air slide from a bottom of said pouch to a downspout above said transport truck;

overflowing said pouch to fill an external tank of said loading tank, said external tank including therein said pouch;

circulating said dry, flowable, granular material from a bottom of said external tank into said elevator pit and back to said pouch via said elevator;

opening a loading slide gate in said downspout to fill said transport truck when in position for loading;

providing high volume, low pressure air to (a) said loading air slide, and (b) said discharging air slide to reduce the angle of repose of said dry, flowable, granular material moving there through;

a bottom of said loading tank being near ground level, but a lower end of said pouch being higher than a top of said transport trucks.

7. The method of transferring dry, flowable, granular material as recited in claim 6 including additional steps of:

filling side silos with dry, flowable, granular material via a fill air slide above said side silos and said loading tank upon operation of selected fill valves;

removing dry, flowing, granular material from said side silos or said external tank to said elevator pit via an empty air slide upon operation of selected slide valves there below, which dry, flowable, granular material is lifted again by said elevator back to said top of said loading tank and again dumped into said pouch;

said high volume, low pressure air also being provided to (a) said fill air slide and (b) said empty air slide;

bottom of said side silos being near ground level.

8. The method of transferring dry, flowable, granular material as recited in claim 7 wherein the angle of repose of dry, flowable, granular material with said high volume, low pressure air is less than 10 degrees.

9. The method of transferring dry, flowable, granular material as recited in claim 8 wherein said loading tank and said silos are connected to, and aerated by, said high volume, low pressure air.

10. The method of transferring dry, flowable, granular material as recited in claim 9 includes the further step of collecting dust prior to discharging said high volume, low pressure air to atmosphere.

11. The method of transferring dry, flowable, granular material as recited in claim 10 wherein said circulating of said dry, flowable, granular material includes in said silos.

\* \* \* \* \*